March 21, 1967 W. KOBER 3,310,695
ALTERNATING CURRENT GENERATOR
Filed June 20, 1966 2 Sheets-Sheet 1
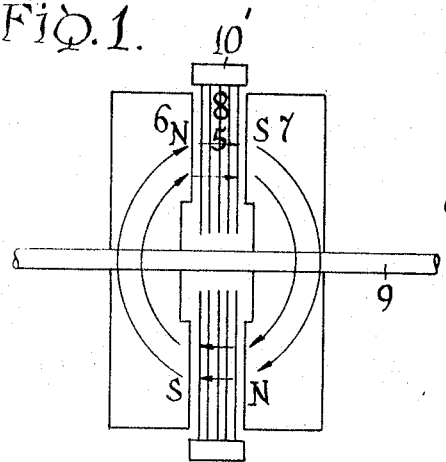
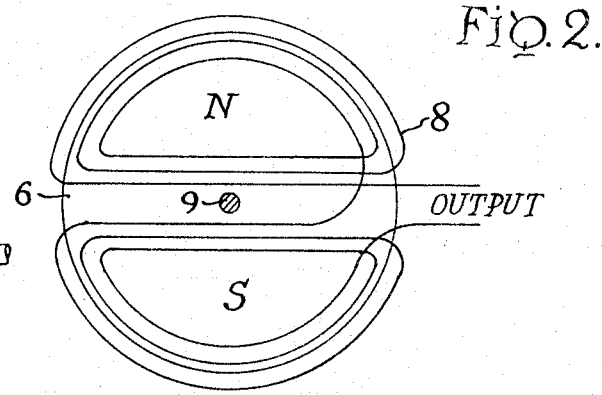
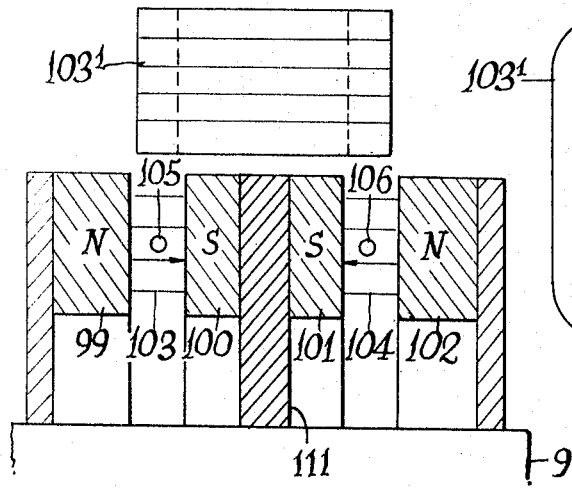
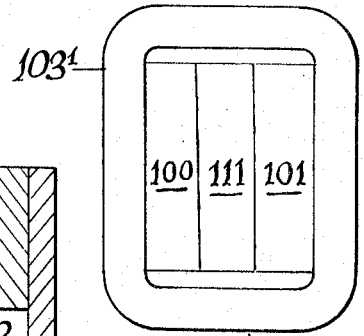
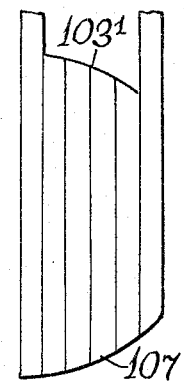
INVENTOR.
William Kober,
BY
Christel + Bean
ATTORNEYS

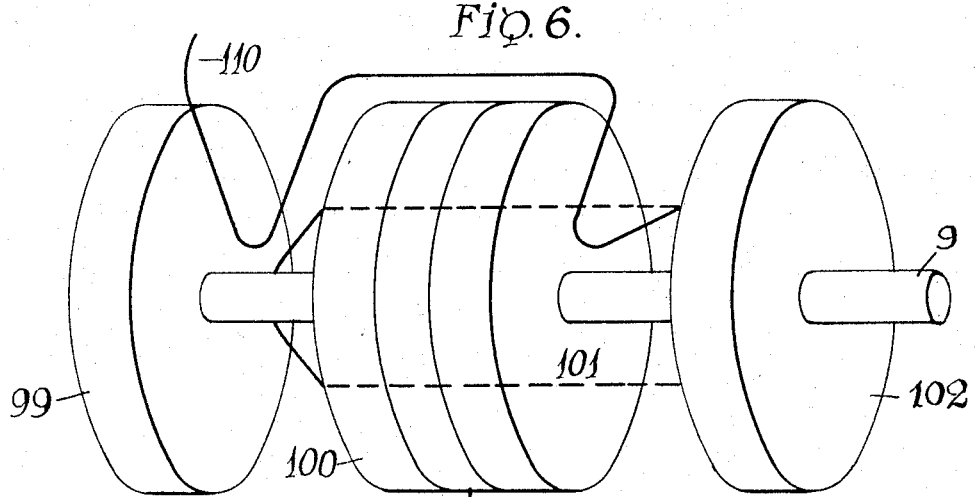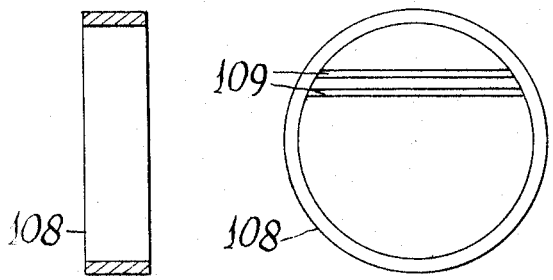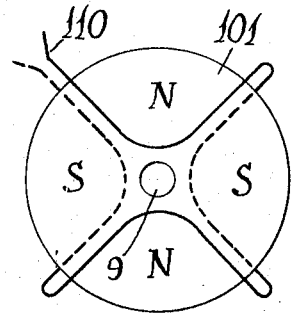

United States Patent Office 3,310,695
Patented Mar. 21, 1967

3,310,695
ALTERNATING CURRENT GENERATOR
William Kober, Rolling Hills, Calif., assignor to The Garrett Corporation, Los Angeles, Calif.
Filed June 20, 1966, Ser. No. 563,624
4 Claims. (Cl. 310—156)

This application is a continuation-in-part of my pending application Ser. No. 238,249, filed Nov. 16, 1962 as a continuation-in-part of my application Ser. No. 770,029, filed Oct. 28, 1958 and now abandoned. This invention relates generally to the electrical art, and more specifically to a new and useful alternating current generator.

An alternating current generator constructed in accordance with my invention is characterized by the provision of axially separated pairs of opposed field producing structures each including flux producing means magnetized in the direction of the axis of rotation to provide axially directed poles and axially directed flux paths between the axially opposed poles of each pair of field structures, and a common armature winding having portions positioned in oppositely directed flux paths between the proximate poles of two field pairs.

In the drawings, which are essentially diagrammatic, like reference numerals denote like parts throughout and:

FIG. 1 is a longitudinal sectional view of the basic alternator construction of my invention;

FIG. 2 is an end elevational view of a field producing structure and the armature winding of FIG. 1;

FIG. 3 is a longitudinal, semi-sectional view of a double field system of this invention, the armature winding being displaced out of operative position between the field structures for greater clarity;

FIGS. 4 and 5 are top plan and side elevational views, respectively, of the armature winding of FIG. 3, FIG. 5 being turned 90° and being taken in the direction of the axis of rotation;

FIG. 6 is a perspective view of an eight pole winding for a double field system;

FIGS. 7 and 8 are longitudinal sectional and elevational views, respectively, of a coil form and support; and FIG. 9 is an end elevation of a field producing structure and an armature winding for a four pole system.

FIGS. 1 and 2 show the basic arrangement of this invention. It takes the form of an axial air gap dynamo, but there is no stator iron at all. The two field producing structures 6 and 7 face each other across air gap 5 which need only be the relatively short distance required to accommodate winding 8. The armature winding 8 obtains no support from stator iron and so requires other methods of support, one supporting structure being indicated by the frame 10'. The winding 8 may or may not contain stator type teeth. Field structures 6 and 7 are mounted on shaft 9, for rotation relative to armature winding 8.

In the above system, using two fields, a considerable length of conductor is used to carry the coil around the outside of the pole, as seen in FIG. 2. It is possible to reduce this length by using a "double" field system. This is shown in FIG. 3.

In FIG. 3, there is provided a first pair of magnetically opposed field structures 99 and 100, magnetically substantially independent of a second pair of magnetically opposed field structures 101 and 102. The pairs of field structures are separated by a flux return member 111, and are linked by a common armature winding 103'.

Each field structure includes flux producing means magnetized in the direction of the axis of rotation, to provide axially directed, alternating poles. The axial direction of magnetization provides axially directed flux paths between the axially opposed poles of the opposed field structures, and concentrates the flux in the air gap area, as indicated at 103 and 104 in FIG. 3.

It will be seen that the result produced is two flux regions 103, between field structures 99 and 100, and 104, between field structures 101 and 102, with opposite magnetic field directions. A turn of conductor going down through the plane of the paper at 105, circling beyond the field poles below and returning at 106 will have additive voltages generated in 105 and 106, which are illustrative conductors of a coil 103', there being two coils 103' in the complete generator. A coil such as 103' (shown out of position in FIG. 3, for clarity) for a two pole form will have little of its length not actually in the magnetic field (note FIG. 4), an obviously desirable result. This "double" form also reduces the diameter of the generator for a given capacity.

The coil form may shorten the coils away from the center, giving the coil the curve of 107 (FIG. 5). A coil such as 103' may be wound around a tubular support such as that shown in FIG. 7, or if the curve of 107 is not desired, the frame may be rectangular or trapezoidal. The coils may be built as a unit, and sections 100 and 101 are assembled inside it, or the two coils may be separate, and installed by bringing them together over the central poles 100 and 101. Permeable teeth may be introduced between wires of the coils 103' where design conditions favor this type, and these teeth may be made of laminated strips such as 109 (FIG. 8) supported by the coil form 108 of FIG. 7, between adjacent turns or turn groups.

This construction is particularly adapted to a two pole system, since there the end conductors have the greatest length, and the saving is the greatest, and installation problems are the simplest. However, a multipole winding may also be used, in which a conductor takes the course of wire 110 in the eight pole winding of FIG. 6. A four pole winding path is indicated in FIG. 9. Mechanical support of the coil groups indicated may be similar to the frame 108 of FIG. 7. The coil groups must be split into two or more sections for mounting in place on the fields.

Having fully disclosed my invention, and described its mode of operation, what I claim as new is:

1. A dynamoelectric machine having an axis of rotation and comprising several field producing structures each including flux producing means magnetized in the direction of said axis to provide axially directed north and south poles, said structures being grouped in axially separated pairs with the north and south poles of one structure axially opposed to the south and north poles, respectively, of the other structure of each pair thereof, thereby providing axially directed flux paths between said opposed poles, an armature winding comprising multiple conductor turns each turn having portions positioned in oppositely directed flux paths between opposed poles of two of said field pairs and encircling portions extending between said two field pairs, and means mounting said armature winding and said field structures for relative rotation about said axis, said two pairs of structures being magnetically substantially independent and linked by said winding which is common thereto.

2. A dynamoelectric machine as set forth in claim 1, wherein said pairs of field structures are coaxially arranged, and said armature winding is looped around adjacent field structures of adjacent pairs thereof.

3. A dynamoelectric machine as set forth in claim 2, wherein said field structures are generally cylindrical, and wherein the portions of said winding encircling said adjacent field structures outside said flux paths are curved about said axis in general conformance to the curvature of said field structures.

4. A dynamoelectric machine having an axis of rotation and comprising several field producing structures of generally cylindrical form each including flux producing means magnetized in the direction of said axis and having axially directed north and south poles, said structures being grouped in axially separated pairs with the north and south poles of one structure axially opposed to the south and north poles, respectively, of the other structure of each pair thereof, thereby providing axially directed flux paths between said opposed poles, an armature winding comprising multiple conductor turns each turn having portions positioned in the flux paths between opposed poles of two of said field pairs and encircling portions extending between said two field pairs, said flux paths between said opposed poles of said two field pairs being oppositely directed, means mounting said armature winding and said field structures for relative rotation about said axis, said two pairs of structures being magnetically substantially independent and linked by said winding which is common thereto, said pairs of field structures being coaxially arranged, and said armature winding being looped around adjacent field structures of adjacent pairs thereof, said adjacent field structures being separated by flux return means, the portions of said winding encircling said adjacent field structures outside said flux paths being curved about said axis in general conformance to the curvature of said field structures.

References Cited by the Examiner
UNITED STATES PATENTS 1,947,269  2/1934  Leibing _____ 310—156

L. L. SMITH, *Assistant Examiner.*

MILTON O. HIRSHFIELD, *Primary Examiner.*